United States Patent
Kao et al.

(10) Patent No.: US 8,964,378 B2
(45) Date of Patent: Feb. 24, 2015

(54) TOUCH PAD AND PORTABLE ELECTRONIC DEVICE THEREOF

(71) Applicant: Wistron Corporation, New Taipei (TW)

(72) Inventors: Jui-Yung Kao, New Taipei (TW); Hung-Ming Huang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 293 days.

(21) Appl. No.: 13/714,451

(22) Filed: Dec. 14, 2012

(65) Prior Publication Data
US 2014/0133112 A1  May 15, 2014

(30) Foreign Application Priority Data
Nov. 13, 2012  (TW) .............................. 101142204 A

(51) Int. Cl.
*G06F 1/16*  (2006.01)

(52) U.S. Cl.
CPC .................................... *G06F 1/1613* (2013.01)
USPC ...................... 361/679.55; 345/173

(58) Field of Classification Search
USPC .............. 361/679.02, 679.1, 679.55; 345/173
See application file for complete search history.

(56) References Cited

U.S. PATENT DOCUMENTS

| | | | |
|---|---|---|---|
| 2007/0052691 A1* | 3/2007 | Zadesky et al. | 345/173 |
| 2007/0205919 A1* | 9/2007 | Wu | 341/22 |
| 2009/0174678 A1 | 7/2009 | Mathew | |
| 2011/0075336 A1* | 3/2011 | Chiang et al. | 361/679.02 |
| 2011/0080354 A1* | 4/2011 | Chiang et al. | 345/173 |
| 2014/0111914 A1* | 4/2014 | Leggett et al. | 361/679.1 |

* cited by examiner

*Primary Examiner* — Adrian S Wilson
(74) *Attorney, Agent, or Firm* — Winston Hsu; Scott Margo

(57) ABSTRACT

A touch pad includes a support frame having an opening, a touch circuit board disposed on a support sheet and having a switch, a top cover connected to a first side of the support frame and covering the touch circuit board, a reinforcement rod disposed on the top cover corresponding to a second side of the support frame, and an elastic member. The support sheet extends inwardly from the opening and has a protruding point. The elastic member is disposed between the touch circuit board and the support sheet for providing an elastic force. When being pressed by an external force, the top cover rotates pivotally relative to the first side of the support frame and drives the touch circuit board to overcome the elastic force. Accordingly, the touch circuit board could move downward relative to the support sheet so that the switch could be triggered by the protruding point.

16 Claims, 5 Drawing Sheets

TOUCH PAD AND PORTABLE ELECTRONIC DEVICE THEREOF

BACKGROUND OF THE INVENTION

1. Field of the Invention

The present invention relates to a touch pad and a portable electronic device, and more specifically, to a touch pad disposing a reinforcement rod on a top cover and a portable electronic device thereof.

2. Description of the Prior Art

In general, a touch computer (e.g. a notebook) usually utilizes assembly of a touch pad and two adjacent press buttons for triggering related button-pressing operations (e.g. clicking an icon or opening a function menu) instead of utilizing a mouse. For further reducing the overall volume of the touch pad, the prior art utilizes the design in which the touch pad could be pressed to trigger a switch integrated therein for omitting disposal of the two adjacent press buttons, so as to be advantageous to the thinning design of the touch computer.

However, in the aforesaid design, when a user presses the touch pad at a position away from the switch (e.g. the periphery of the touch pad), deflection of the touch pad may occur due to insufficient structural strength of the touch pad, so as to make the user unable to trigger the switch surely and know clearly whether the switch is triggered. Thus, the aforesaid design provides the user with a poor pressing feeling and causes the problem that the switch could not be triggered surely.

SUMMARY OF THE INVENTION

An objective of the present invention is to provide a touch pad disposing a reinforcement rod on a top cover and a portable electronic device thereof for solving the prior art problem.

The present invention provides a touch pad including a support frame, a touch circuit board, a top cover, a reinforcement rod, and an elastic member. The support frame has an opening, a first side, and a second side. A support sheet extends inward from the opening and has a protruding point. The first side is opposite to the second side. The touch circuit board is disposed on the support sheet and has a switch. The top cover is connected to the first side of the support frame and covers the touch circuit board. The reinforcement rod is disposed on the top cover corresponding to the second side of the support frame. The elastic member is disposed between the touch circuit board and the support sheet for providing an elastic force to the touch circuit board so as to make the touch circuit board movable relative to the support sheet. When the top cover is pressed by an external force, the top cover rotates pivotally relative to the first side of the support frame and drives the touch circuit board to overcome the elastic force, so that the touch circuit board could move downward relative to the support sheet and the switch could be triggered by the protruding point.

According to the claimed invention, the touch circuit board further has a center longitudinal axis. The switch is disposed at a position corresponding to the center longitudinal axis of the touch circuit board.

According to the claimed invention, the elastic member includes at least one elastic arm, and the at least one elastic arm is disposed on the support sheet.

According to the claimed invention, the top cover has a rotating shaft corresponding to the first side of the support frame. The rotating shaft is pivotally connected to the first side of the support frame.

According to the claimed invention, the top cover further has two corners. The reinforcement rod is movably connected to the top cover and has two bending portions, and the two bending portions bend along the two corners of the top covers respectively.

According to the claimed invention, at least one hook member is formed on the top cover corresponding to the reinforcement rod for hooking the reinforcement rod so as to make the reinforcement rod movable relative to the top cover.

The present invention further provides a portable electronic device including a device body and a touch pad. The touch pad is used for operating the device body and includes a support frame, a touch circuit board, a top cover, a reinforcement rod, and an elastic member. The support frame is disposed on the device body and has an opening, a first side, and a second side. A support sheet extends inward from the opening and has a protruding point. The first side is opposite to the second side. The touch circuit board is disposed on the support sheet and has a switch. The top cover is connected to the first side of the support frame and covers the touch circuit board. The reinforcement rod is disposed on the top cover corresponding to the second side of the support frame. The elastic member is disposed between the touch circuit board and the support sheet for providing an elastic force to the touch circuit board so as to make the touch circuit board movable relative to the support sheet. When the top cover is pressed by an external force, the top cover rotates pivotally relative to the first side of the support frame and drives the touch circuit board to overcome the elastic force, so that the touch circuit board could move downward relative to the support sheet and the switch could be triggered by the protruding point.

In summary, the present invention utilizes the reinforcement rod to be disposed on the top cover of the touch pad, so as to improve the overall structural strength of the touch pad and make the pressing pressure received by the top cover transmitted over the top cover uniformly via the reinforcement rod. Accordingly, the whole top cover could be rotated synchronously when being pressed. In such a manner, even if the user presses the periphery of the top cover of the touch pad, the present invention could surely prevent deflection of the top cover. Therefore, no matter which position the top cover is pressed at, the whole top cover could rotate synchronously via disposal of the reinforcement rod to press the touch circuit board to move downward until the protruding point on the support sheet of the support frame triggers the switch of the touch circuit board. Thus, the touch pad provided by the present invention could not only provide the user with a preferable pressing feeling, but also solve the aforementioned prior art problem that the switch could not be triggered, so that the operational comfort and the triggering sensitivity of the touch pad could be greatly improved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
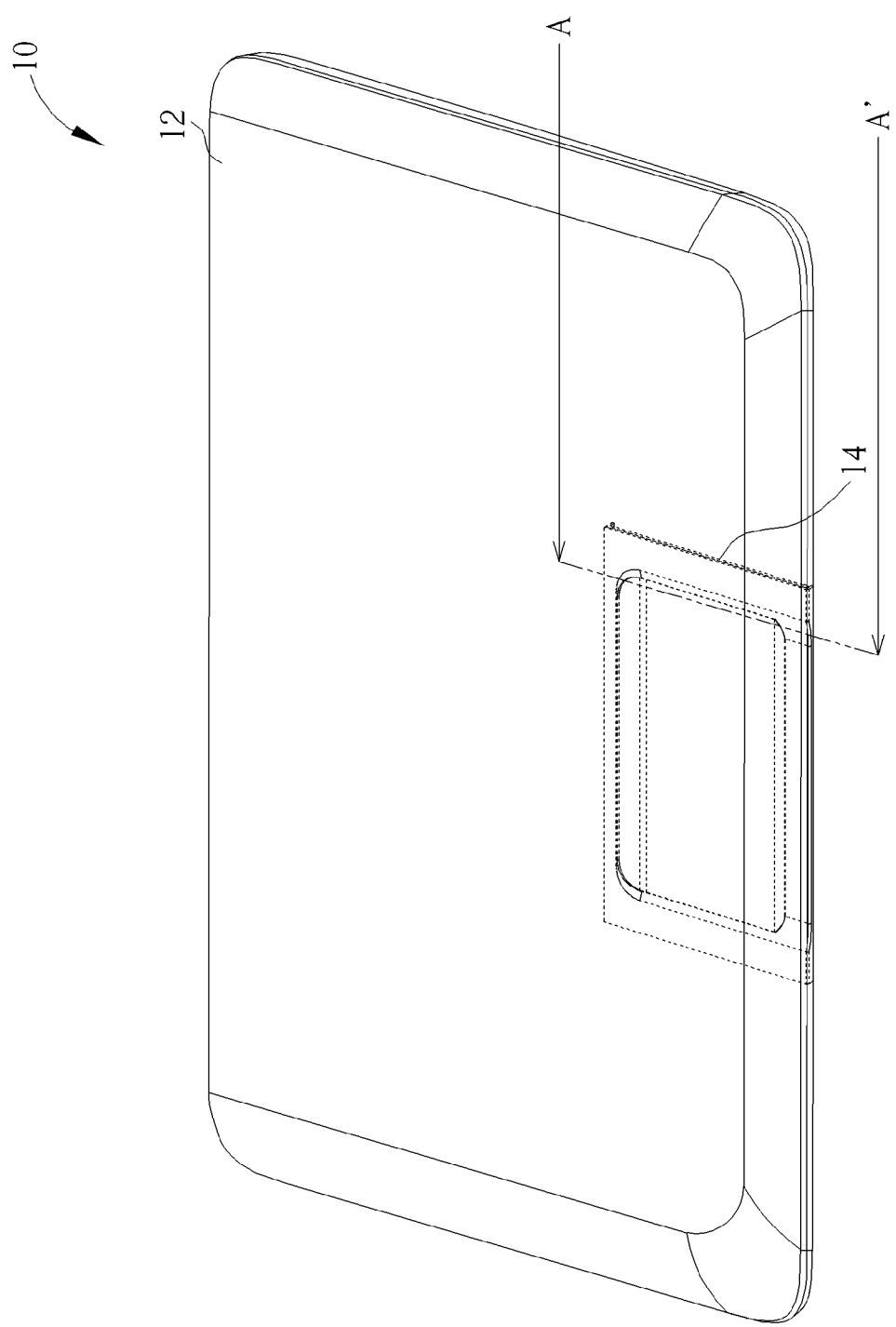
FIG. 1 is a diagram of a portable electronic device according to an embodiment of the present invention.

Please refer to FIG. 1, which is a diagram of a portable electronic device 10 according to an embodiment of the present invention. In FIG. 1, the portable electronic device 10 is depicted as a notebook for example, but not limited thereto, meaning that the portable electronic device 10 could be other portable electronic apparatus. As shown in FIG. 1, the portable electronic device 10 includes a device body 12 and a touch pad 14. The device body 12 could include major components (e.g. a liquid crystal display screen, a motherboard, and a keyboard) in a conventional portable electronic device besides a touch pad, and the related description is omitted herein since it is commonly seen in the prior art.

Figure 2:
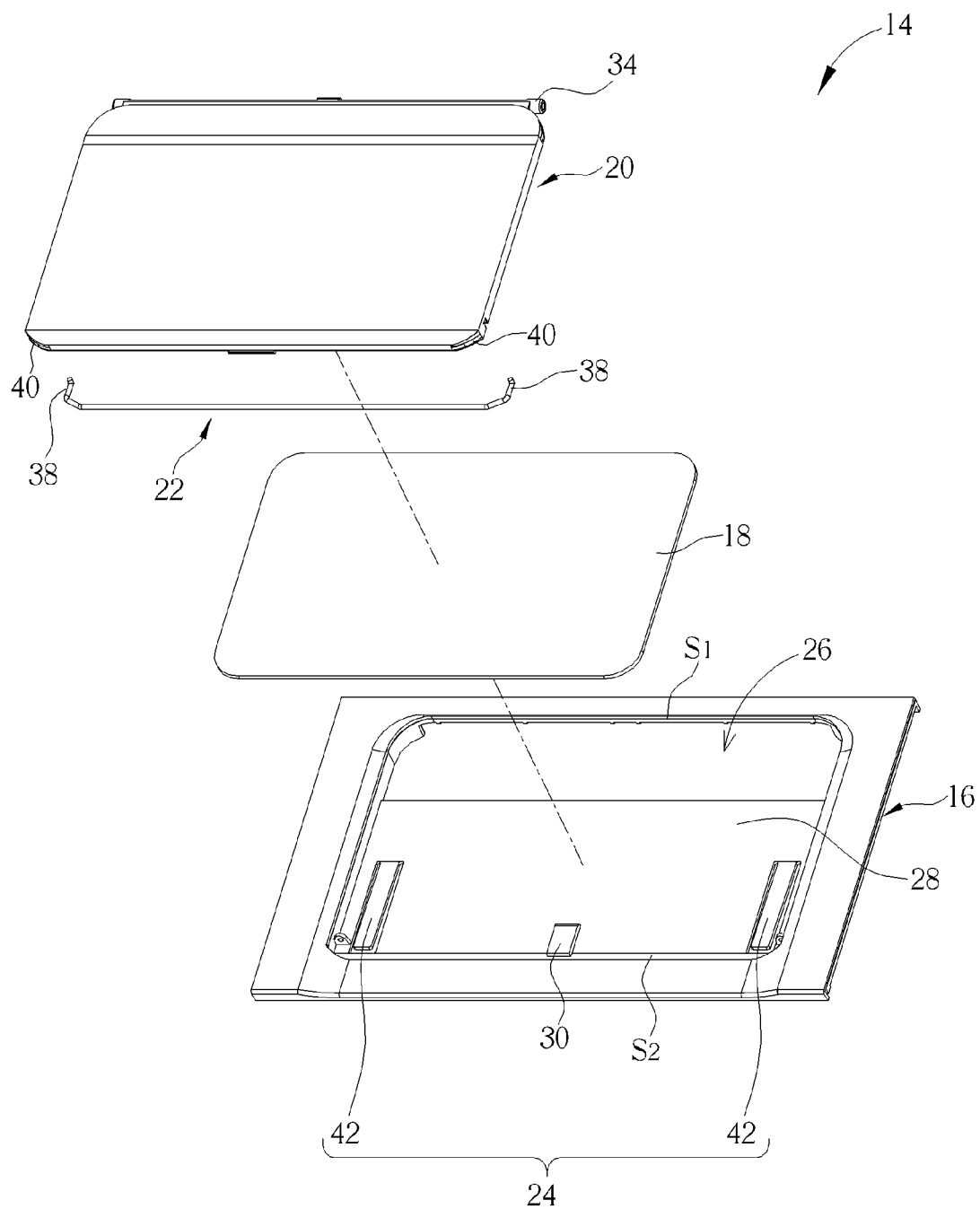
FIG. 2 is an exploded diagram of a touch pad in FIG. 1.
Figure 3:
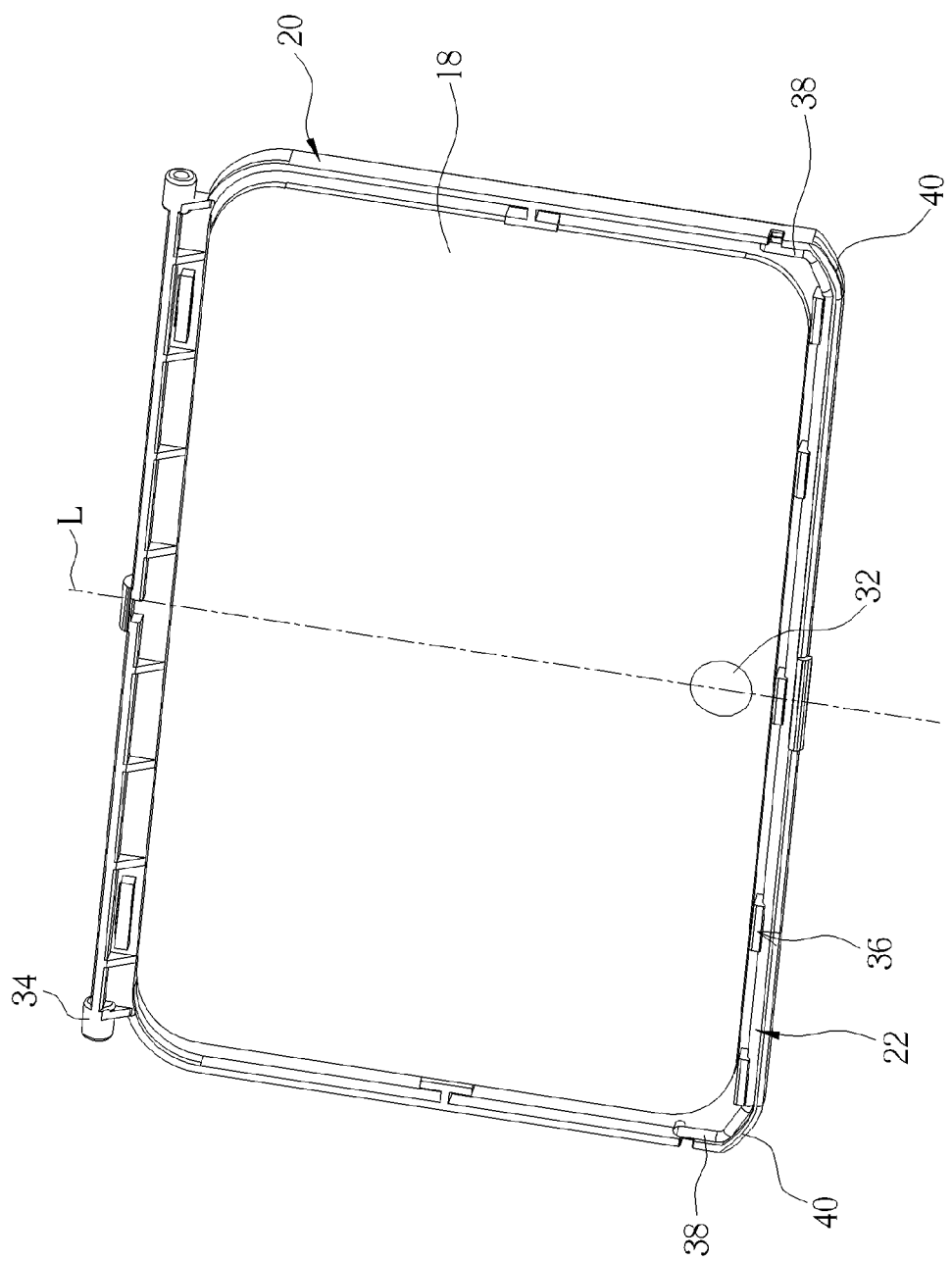
FIG. 3 is a top view of a touch circuit board and a reinforcement rod in FIG. 2 being disposed on a top cover.

Please refer to FIG. 2 and FIG. 3. FIG. 2 is an exploded diagram of the touch pad 14 in FIG. 1. FIG. 3 is a top view of a touch circuit board 18 and a reinforcement rod 22 in FIG. 2 being disposed on a top cover 20. The touch pad 14 is used for performing touch operations and button-pressing operations (e.g. clicking an icon or opening a function menu) of the device body 12. As shown in FIG. 2 and FIG. 3, the touch pad 14 includes a support frame 16, the touch circuit board 18, the top cover 20, the reinforcement rod 22, and an elastic member 24. The support frame 16 is disposed on the device body 12 and has an opening 26, a first side $S_1$, and a second side $S_2$. A support sheet 28 extends inward from the opening 26. The first side $S_1$ is opposite to the second side $S_2$. The support sheet 28 has a protruding point 30, and the touch circuit board 18 is correspondingly disposed on the support sheet 28 and electrically connected to the device body 12 and has a switch 32 corresponding to the protruding point 30. In this embodiment, the touch circuit board 18 has a center longitudinal axis L. The switch 32 could be disposed at a position substantially corresponding to the center longitudinal axis L of the touch circuit board 18, but not limited thereto. That is, disposal of the switch 32 and the corresponding protruding point 30 could vary with the practical application of the touch pad 14.

The top cover 20 is connected to the first side $S_1$ of the support frame 16 and covers the touch circuit board 18. In this embodiment, the present invention could utilize a shaft pivoting design to connect the top cover 20 to the first side $S_1$ of the support frame 16 so as to reduce space needed for connection of the top cover 20 and the support frame 16. Accordingly, the overall volume of the touch pad 14 could be further reduced to be advantageous to the thinning design of the portable electronic device 10. For example, as shown in FIG. 2 and FIG. 3, the top cover 20 could has a rotating shaft 34 corresponding to the first side $S_1$ of the support frame 16. The rotating shaft 34 is pivotally connected to the first side $S_1$ of the support frame 16, so that the top cover 20 could rotate pivotally relative to the first side $S_1$ of the support frame 16. Furthermore, the present invention could utilize other connection design instead to connect the top cover 20 to the first side $S_1$ of the support frame 16. For example, the top cover 20 could be connected to the first side $S_1$ of the support frame 16 in a screw locking manner. As for which design is utilized, it depends on the practical application of the touch pad 14.

The reinforcement rod 22 is disposed on the top cover 20 corresponding to the second side $S_2$ of the support frame. In practical application, the reinforcement rod 22 could be movable relative to the top cover 20 by utilizing a conventional connection design. For example, in this embodiment, the top cover 20 could have at least one hook member 36 (five shown in FIG. 3, but not limited thereto) corresponding to the reinforcement rod 22. The hook member 36 is used for hooking the reinforcement rod 22 to make the reinforcement rod 22 movable relative to the top cover 20 rather than fixed to the top cover 20. Furthermore, as shown in FIG. 3, the reinforcement rod 22 could have two bending portions 38, and the top cover 20 could have two corners 40. The two bending portions 38 of the reinforcement rod 22 could respectively bend along the two corners 40 of the top cover 20 so as to improve the overall structural strength and the pressure transmission efficiency of the reinforcement rod 22. The elastic member 24 is disposed between the touch circuit board 18 and the support frame 28. In this embodiment, the elastic member 24 includes at least one elastic arm 42 (two shown in FIG. 2, but not limited thereto). The elastic arm 42 is disposed on the support sheet 28 for providing an elastic force to the touch circuit board 18 so that the touch circuit board 18 could move upward and downward relative to the support sheet 28.

It should be mentioned that the position and the structural design of the elastic member 24 could be not limited to the aforesaid embodiment. In other words, all designs of utilizing the elastic force provided by the elastic member disposed between the touch circuit board and the support sheet to make the touch circuit board movable relative to the support sheet could be utilized by the present invention. For example, the elastic member 24 could be a spring disposed between the touch circuit board 18 and the support sheet 28 or be disposed on the touch circuit board 18.

Figure 4:
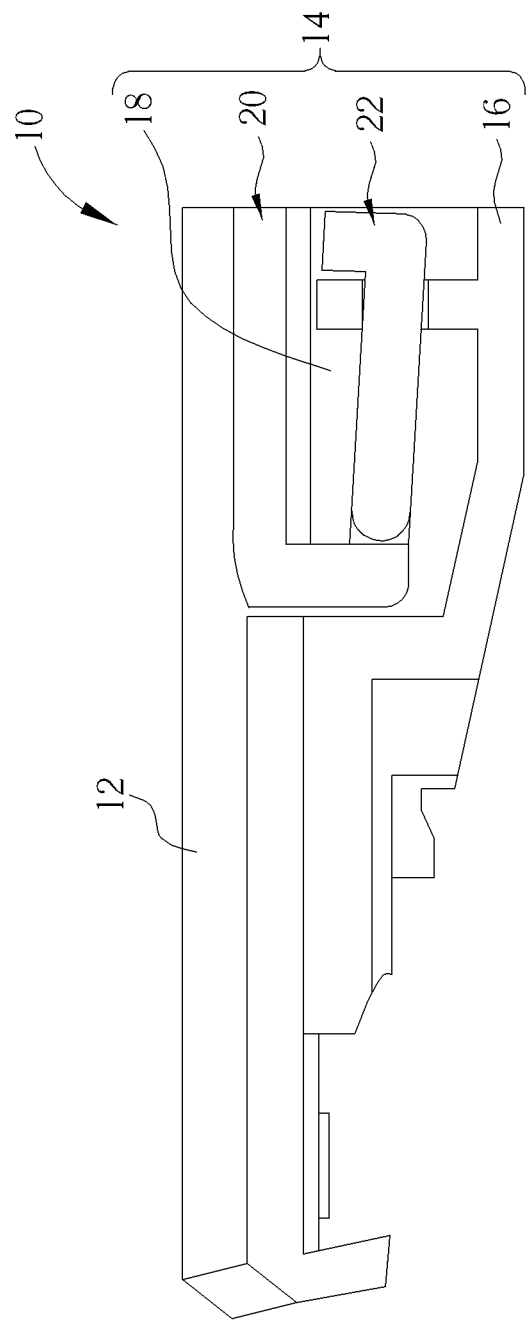
FIG. 4 is a partial sectional diagram of the portable electronic device in FIG. 1 along a sectional line A-A'.
Figure 5:
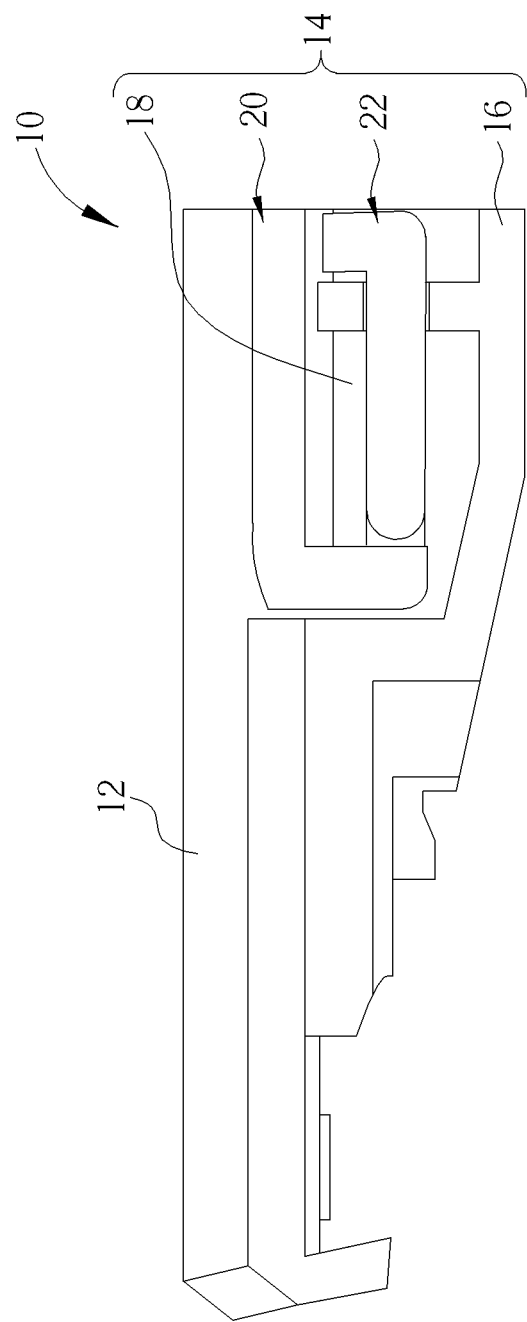
FIG. 5 is a partial sectional diagram of the top cover in FIG. 4 being pressed.

More detailed description for the pressing operation of the touch pad 14 is provided as follows. Please refer to FIG. 4 and FIG. 5. FIG. 4 is a partial sectional diagram of the portable electronic device 10 in FIG. 1 along a sectional line A-A'. FIG. 5 is a partial sectional diagram of the top cover 20 in FIG. 4 being pressed. Via disposal of the reinforcement rod 22, the overall structural strength of the top cover 20 could be improved. Furthermore, during a user presses the top cover 20 from a position as shown in FIG. 4 to a position as shown in FIG. 5, the pressing pressure received by the top cover 20 could be transmitted over the top cover 20 via the reinforcement rod 22 so as to prevent deflection of the top cover 20. Furthermore, via the design in which the reinforcement rod 22 is movably disposed on the top cover 20, the reinforcement rod 22 could slide correspondingly from a position as shown in FIG. 4 to a position as shown in FIG. 5 during the aforesaid pressing process, so that the pressing pressure received by the top cover 20 could be transmitted over the top cover 20 more uniformly via sliding of the reinforcement rod 22.

Via the aforesaid structural design, even if the user presses the periphery of the top cover 20 (e.g. a right side or a left side of the top cover 20), the present invention could surely prevent deflection of the top cover 20. Therefore, no matter which position the top cover 20 is pressed at, the whole top cover 20 could rotate synchronously relative to the first side $S_1$ of the support frame via disposal of the reinforcement rod 22 to press the touch circuit board 18 and then drive the touch circuit board 18 to overcome the elastic force provided by the elastic member 24. Accordingly, the touch circuit board 18 could move downward relative to the support sheet 28 until the protruding point 30 on the support sheet 28 triggers the switch 32 of the touch circuit board 18. In such a manner, the switch 32 could be triggered surely for performing the button-pressing operations (e.g. clicking an icon or opening a function menu) of the device body 12, so that the touch pad 14 could provide the user with a preferable pressing feeling and efficiently solve the aforementioned prior art problem that the switch could not be triggered.

To be noted, even if deformation of the top cover 20 occurs, the reinforcement rod 22 would not deform with the top cover 20 since the reinforcement rod 22 is movably disposed on the top cover 20 rather than fixed to the top cover 20. Thus, even when deformation of the top cover 20 occurs, the overall structural strength of the top cover 20 could be still improved via disposal of the reinforcement rod 22 and the pressing pressure received by the top cover 20 could be still transmitted over the top cover 20 uniformly via the reinforcement rod 22.

Compared with the prior art, the present invention utilizes the reinforcement rod to be disposed on the top cover of the touch pad, so as to improve the overall structural strength of the touch pad and make the pressing pressure received by the top cover transmitted over the top cover uniformly via the reinforcement rod. Accordingly, the whole top cover could be rotated synchronously when being pressed. In such a manner, even if the user presses the periphery of the top cover of the touch pad, the present invention could surely prevent deflection of the top cover. Therefore, no matter which position the top cover is pressed at, the whole top cover could rotate synchronously via disposal of the reinforcement rod to press the touch circuit board to move downward until the protruding point on the support sheet of the support frame triggers the switch of the touch circuit board. Thus, the touch pad provided by the present invention could not only provide the user with a preferable pressing feeling, but also solve the aforementioned prior art problem that the switch could not be triggered, so that the operational comfort and the triggering sensitivity of the touch pad could be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch pad comprising:
    a support frame having an opening, a first side, and a second side, a support sheet extending inward from the opening and having a protruding point, the first side being opposite to the second side;
    a touch circuit board disposed on the support sheet and having a switch;
    a top cover connected to the first side of the support frame and covering the touch circuit board;
    a reinforcement rod disposed on the top cover corresponding to the second side of the support frame; and
    an elastic member disposed between the touch circuit board and the support sheet for providing an elastic force to the touch circuit board so as to make the touch circuit board movable relative to the support sheet;
    wherein when the top cover is pressed by an external force, the top cover rotates pivotally relative to the first side of the support frame and drives the touch circuit board to overcome the elastic force, so that the touch circuit board could move downward relative to the support sheet and the switch could be triggered by the protruding point.

2. The touch pad of claim 1, wherein the touch circuit board further has a center longitudinal axis, and the switch is disposed at a position corresponding to the center longitudinal axis of the touch circuit board.

3. The touch pad of claim 1, wherein the elastic member comprises at least one elastic arm, and the at least one elastic arm is disposed on the support sheet.

4. The touch pad of claim 1, wherein the top cover has a rotating shaft corresponding to the first side of the support frame, and the rotating shaft is pivotally connected to the first side of the support frame.

5. The touch pad of claim 4, wherein the top cover further has two corners, the reinforcement rod is movably connected to the top cover and has two bending portions, and the two bending portions bend along the two corners of the top covers respectively.

6. The touch pad of claim 5, wherein at least one hook member is formed on the top cover corresponding to the reinforcement rod for hooking the reinforcement rod so as to make the reinforcement rod movable relative to the top cover.

7. The touch pad of claim 6, wherein the touch circuit board further has a center longitudinal axis, and the switch is disposed at a position corresponding to the center longitudinal axis of the touch circuit board.

8. The touch pad of claim 7, wherein the elastic member comprises at least one elastic arm, and the at least one elastic arm is disposed on the support sheet.

9. A portable electronic device comprising:
    a device body; and
    a touch pad for operating the device body, the touch pad comprising:
        a support frame disposed on the device body and having an opening, a first side, and a second side, a support sheet extending inward from the opening and having a protruding point, the first side being opposite to the second side;
        a touch circuit board disposed on the support sheet and having a switch;
        a top cover connected to the first side of the support frame and covering the touch circuit board;
        a reinforcement rod disposed on the top cover corresponding to the second side of the support frame; and
        an elastic member disposed between the touch circuit board and the support sheet for providing an elastic force to the touch circuit board so as to make the touch circuit board movable relative to the support sheet;
    wherein when the top cover is pressed by an external force, the top cover rotates pivotally relative to the first side of the support frame and drives the touch circuit board to overcome the elastic force, so that the touch circuit board could move downward relative to the support sheet and the switch could be triggered by the protruding point.

10. The portable electronic device of claim 9, wherein the touch circuit board further has a center longitudinal axis, and the switch is disposed at a position corresponding to the center longitudinal axis of the touch circuit board.

11. The portable electronic device of claim 9, wherein the elastic member comprises at least one elastic arm, and the at least one elastic arm is disposed on the support sheet.

12. The portable electronic device of claim 9, wherein the top cover has a rotating shaft corresponding to the first side of the support frame, and the rotating shaft is pivotally connected to the first side of the support frame.

13. The portable electronic device of claim 12, wherein the top cover further has two corners, the reinforcement rod is movably connected to the top cover and has two bending portions, and the two bending portions bend along the two corners of the top covers respectively.

14. The portable electronic device of claim 13, wherein at least one hook member is formed on the top cover corresponding to the reinforcement rod for hooking the reinforcement rod so as to make the reinforcement rod movable relative to the top cover.

15. The portable electronic device of claim 14, wherein the touch circuit board further has a center longitudinal axis, and the switch is disposed at a position corresponding to the center longitudinal axis of the touch circuit board.

16. The portable electronic device of claim 15, wherein the elastic member comprises at least one elastic arm, and the at least one elastic arm is disposed on the support sheet.

* * * * *